(12) United States Patent
Miller

(10) Patent No.: US 11,056,298 B2
(45) Date of Patent: Jul. 6, 2021

(54) EARTHING SWITCH HAVING DYNAMIC BRAKING RESISTORS

(71) Applicant: GE Energy Power Conversion Technology Limited, Warwicksire (GB)

(72) Inventor: Zane Taylor Miller, Salem, VA (US)

(73) Assignee: GE Energy Power Conversion Technology Limited, Warwickshire (GB)

( * ) Notice: Subject to any disclaimer, the term of this patent is extended or adjusted under 35 U.S.C. 154(b) by 286 days.

(21) Appl. No.: 16/034,884

(22) Filed: Jul. 13, 2018

(65) Prior Publication Data
US 2020/0020494 A1 Jan. 16, 2020

(51) Int. Cl.
*H01H 33/59* (2006.01)
*H02H 3/087* (2006.01)
*H01H 31/00* (2006.01)
*H02B 13/075* (2006.01)

(52) U.S. Cl.
CPC ........ *H01H 33/596* (2013.01); *H01H 31/003* (2013.01); *H02B 13/075* (2013.01); *H02H 3/087* (2013.01)

(58) Field of Classification Search
USPC .............................. 361/1, 2, 8, 9
See application file for complete search history.

(56) References Cited

U.S. PATENT DOCUMENTS

| | | | |
|---|---|---|---|
| 2005/0174081 A1* | 8/2005 | Nguyen | H02P 3/12 318/376 |
| 2014/0368134 A1* | 12/2014 | Nagatsuka | B60L 3/00 318/380 |
| 2016/0257188 A1* | 9/2016 | Sommer | B60K 6/44 |

* cited by examiner

*Primary Examiner* — Thienvu V Tran
*Assistant Examiner* — Ivan Laboy
(74) *Attorney, Agent, or Firm* — Wood IP LLC

(57) ABSTRACT

An earthing switch circuit is provided and is connected to a direct current (DC) link including a positive terminal and a negative terminal having capacitance or energy storage capability. The earthing switch circuit includes a dynamic braking circuit having a single or plurality of dynamic braking (DB) switches, and at least one dynamic braking (DB) resistor disposed between the plurality of DB switches, and an earthing switch connected between the DB circuit and ground. The at least one DB resistor dissipates energy thermally when performing a dynamic braking operation and simultaneously decreases in-rush current for the earthing switch circuit upon closure of the earthing switch.

12 Claims, 3 Drawing Sheets

EARTHING SWITCH HAVING DYNAMIC BRAKING RESISTORS

I. TECHNICAL FIELD

The present invention relates generally to an earthing switch for power devices e.g., a power converter. In particular, the present invention relates to an earthing switch employing dynamic braking (DB).

II. BACKGROUND

Power devices, such as power converters, require routine maintenance and typically include the application of grounding cables to conduct such maintenance. Maintenance operators apply the grounding cables via use of a fiberglass hot stick, to electrically connect large direct current (DC) link positive and negative buses to a ground bus. Thus, ensuring that any electrical potential remaining on the positive and negative conductors is drained to ground creates an assumption it is safe to perform the routine maintenance.

However, it is inconvenient to carry grounding cables and fiberglass application sticks to each site where maintenance is performed. Cabinet covers must be removed to reveal the grounding balls, often exposing the technician to many dangerous voltages and shock hazards. Therefore, application of the ground cables requires qualified personnel to apply them, and even so, application can still present potential problems.

When the positive and negative buses are connected to the ground bus via the ground cables, large voltages will cause massive currents to initially flow which will only be reduced as the voltage begins to drop. Thus, applying the grounding cables can be a dangerous operation because an arc flash event can occur. And because of this large current flow, qualified personnel are trained to apply the grounding cables to the grounding balls with significant speed and force. In this attempt to make the connections forcefully, the technician can sometimes miss, which, in an open cabinet with many circuits and voltages present, can also induce small arcs or even equipment damage.

This combination of inconvenience and danger to both personnel and equipment make it desirable to provide an earthing switch that makes the maintenance process safer and easier for maintenance technicians.

III. SUMMARY OF THE EMBODIMENTS

Given the aforementioned deficiencies, embodiments of the present invention provides an earthing switch circuit that employs the dual use of a given resistor. The resistor is provided in a power converter to serve as both a dynamic braking resistor and as the inrush current reducing resistor for the earthing switch circuit.

The employment of a resistor in this earthing circuit significantly reduces the current the switch must endure, thereby making the earthing system smaller and more economical. By using a single resistor which can serve as both a dynamic braking resistor and a discharge resistor in the power converter, the system is optimized for cost and scale.

One embodiment of the present invention provides an earthing switch circuit, in the presence of a DB circuit, connected between two DC rails, consisting of a positive terminal and a negative terminal. The DB circuit may include only one, or a plurality of DB switches and at least one DB resistor, which converts electrical energy to thermal energy when employed. The DC rails also carry some capacitance or energy storage capability between them. In this embodiment the earthing switch circuit connects between one DC rail (positive or negative) and the dual-purpose resistor, the opposite side of which is connected to the opposing DC rail. At least one pole of the earthing switch is also connected to ground (i.e., protective earth (PE)). Therefore, when the earthing switch becomes closed, all three (3) potentials, positive, negative, and ground, become connected at a single electrical node, transiently reducing voltage until all potentials are 0V and positive and negative rails are short-circuited together.

According to embodiments of the present invention, the integration of the DB resistor, or portion thereof, in the earthing switch circuit limits the short-circuit current experienced by the earthing switch during the voltage transient and allows for optimal circuit component sizing. Additionally, the dual usage of the DB resistor as an in-rush limiter for the earthing switch also eliminates the need for additional impedance components.

The foregoing has broadly outlined some of the aspects and features of the embodiment, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 1:
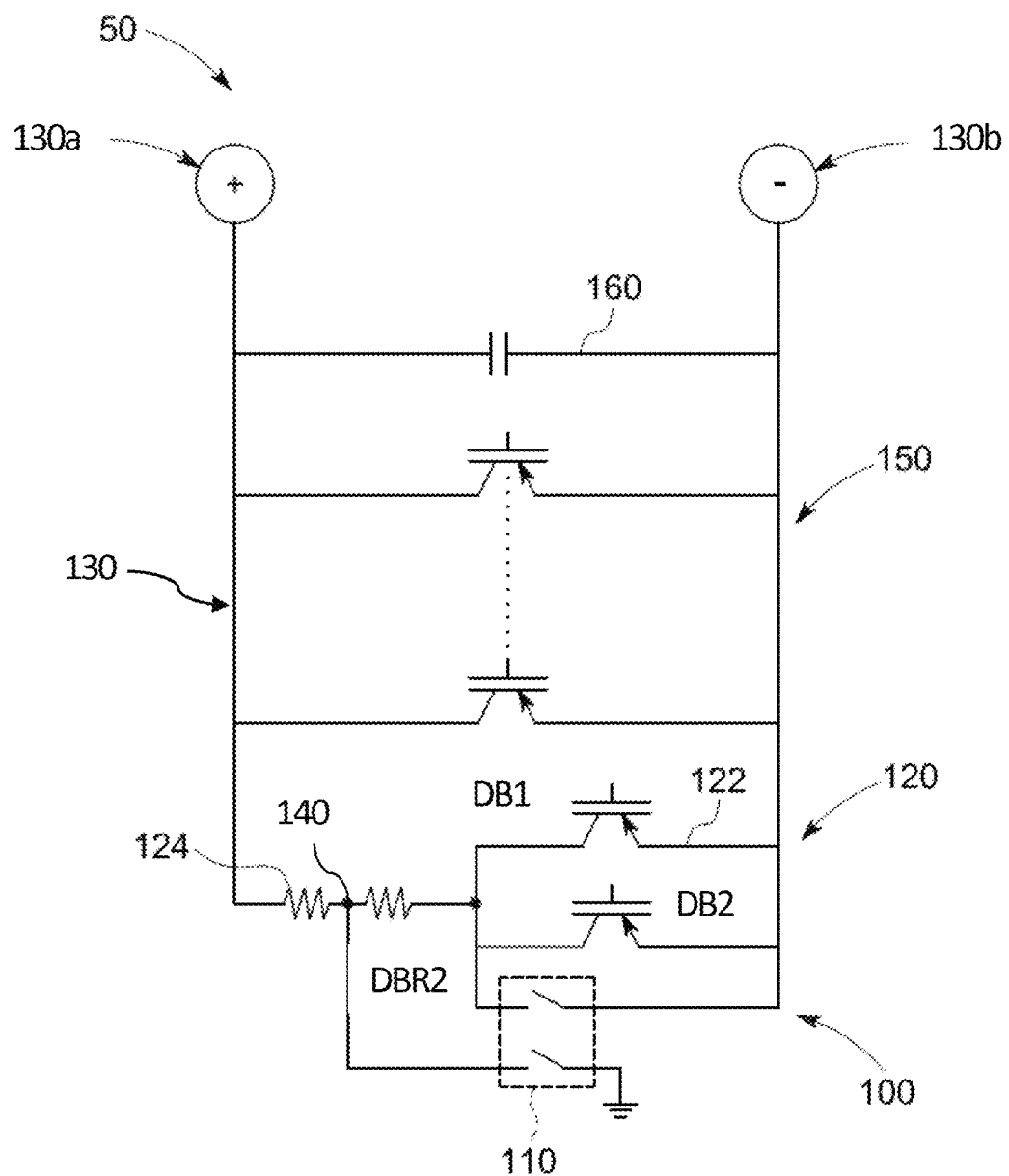
FIG. 1 is a circuit schematic illustrating an earthing switch circuit that can be implemented within one or more embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, apparatuses, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

The use of an earthing switch according to the embodiments of the present invention provides the advantages of improving the safety and convenience of maintenance operators while performing routine maintenance of power devices (e.g., power converters). The earthing switch is electrically connected with the positive and negative terminals to ground, draining any potential and ensuring that no voltage begins to appear on the circuit. Thus, the present invention eliminates the need for use of grounding cables, fiberglass application sticks, wait time, and reduces costs associated with the maintenance process. The present invention can be implemented within a wind turbine environment, for example, and in any other suitable environments.

FIG. 1 illustrates a DC link 50 including an earthing switch circuit 100 according to one or more embodiments of the present invention. As shown, the earthing switch circuit 100 includes an earthing switch 110 connected with a DB circuit 120, connected between two DC rails 130, consisting of a positive terminal 130a and a negative terminal 130b. The DC rails 130 carry some capacitance or energy storage capability between them. The earthing switch circuit 100 further includes a conversion bridge 150 comprising a plurality of switches and a bulk capacitance 160 disposed between the DC rails 130.

The DB circuit 120 includes one or more DB switches (DB1 and DB2) 122 and one or more DB resistors (DBR1 and DBR2) 124, which converts electrical energy to thermal energy when employed. The DB resistors 124 are configured to perform the dual function of dissipating energy when the DB switches 122 are operated, and simultaneously reduce in-rush current for the earthing switch circuit 100 when the earthing switch 110 is operated In this embodiment, the earthing switch 110 connects between one DC rail 130 (positive terminal 130a or negative terminal 130b) and the DB resistors 124, the opposite side of which is connected to the opposing DC rail 130. At least one pole of the earthing switch 110 is also connected to ground (i.e., protective earth (PE)).

When the earthing switch 110 is closed, all three (3) potentials (i.e., positive, negative, and ground), become connected at a single electrical node 140, transiently reducing voltage until all potentials are 0V and the DC rails 130 including the positive terminal 130a and the negative terminal 130b are short-circuited together.

Integration of the DB resistors 124, or portion thereof, in the earthing switch circuit 100 therefore limits the short-circuit current experienced by the earthing switch 110 during the voltage transient.

Earthing switch circuits according to other embodiments of the present invention will now be discussed with reference to FIGS. 2, 3, and 4.

Figure 2:
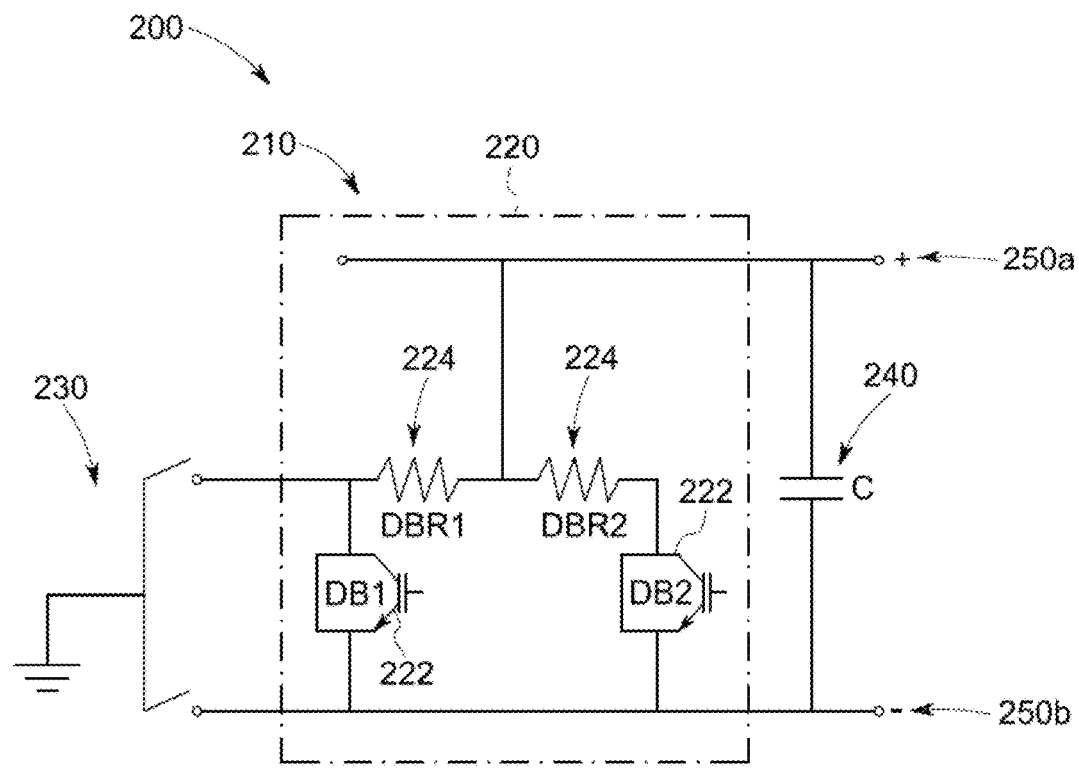
FIG. 2 is a circuit schematic illustrating an earthing switch circuit that can be implemented within one or more alternative embodiments of the present invention.

In FIG. 2, a DC link 200 is provided. The DC link 200 includes an earthing switch circuit 210 comprising a DB circuit 220 in communication with an earthing switch (e.g., a two-pole one-throw switch) 230 connected to ground. The earthing switch circuit 210 is connected between DC rails including positive terminal 250a and negative terminal 250b with at least one DB resistor (DBR1 and DBR2) 224 or a portion thereof, in series.

The present invention is not limited to a particular type of earthing switch. Therefore, according to other embodiments, the earthing switch 230 could be a plurality of single pole switches, or multi-pole switches.

The DB circuit 220 comprises a plurality of DB switches 222 (e.g., two DB switches (DB1 and DB2), and at least one DB resistor 224 (e.g., DBR1 and DBR2) disposed between the plurality of DB switches 222. According to one or more embodiments, the present invention is not limited to any number of DB resistors 224.

The plurality of DB resistors 224 can be disposed in parallel or series together and between the DB switches 222, as shown in FIG. 2.

The DC link 200 further includes a large capacitance 240, which according to one example, can be of approximately 72 millifarads (mF) at 1200V connected between the DC rails, a positive terminal 250a, and negative terminal 250b where the voltage at the positive terminal 250a is approximately 600V or above and the voltage at the negative terminal 250b is approximately −600V or below. The present invention is not limited to the capacitance or voltage being of a particular amount and can be varied to be suitable for the purposes set forth herein. According to an embodiment, the voltage at the positive terminal 250a and the negative terminal 250b are approximately equipotential from ground in opposing polarity. According to another embodiment, the circuit is suitable in cases where the DC link 200 is biased in some way, i.e. one rail near 0V, the other at a nominal rated voltage, for example, 1200V such that the DC rails and the DB resistors 224 are tapped differently, based on where the current would flow.

As further shown in FIG. 2, the DB switches 222 are each connected at one end to the positive terminal 250a or the negative terminal 250b and to one pole of the earthing switch 230, and at the other end to an end of each respective DB resistor 224. The opposite ends of the DB resistors 224 can be connected with the positive terminal 250a or the opposing terminal, negative terminal 250b therebetween. The DB resistors 224 are also connected to poles of the earthing switch 230.

According to an embodiment, the DB resistors 224 are configured to perform the dual function of dissipating energy when the DB switches 222 are operated. Simultaneously, the DB resistors 224 perform reducing in-rush current for the earthing switch circuit 210 when the earthing switch 230 is operated.

Regarding reducing the in-rush current, when voltage on the DC link 200 increases to a high voltage amount, for example, 1300V, the DB switches 222 start duty cycling the negative voltage from the negative terminal 250b into the DB circuit 220. This burns the energy between the positive terminal 250a and the negative terminal 250b, and drains the energy of the DC link 200 at the DB resistors 224.

Figure 3:
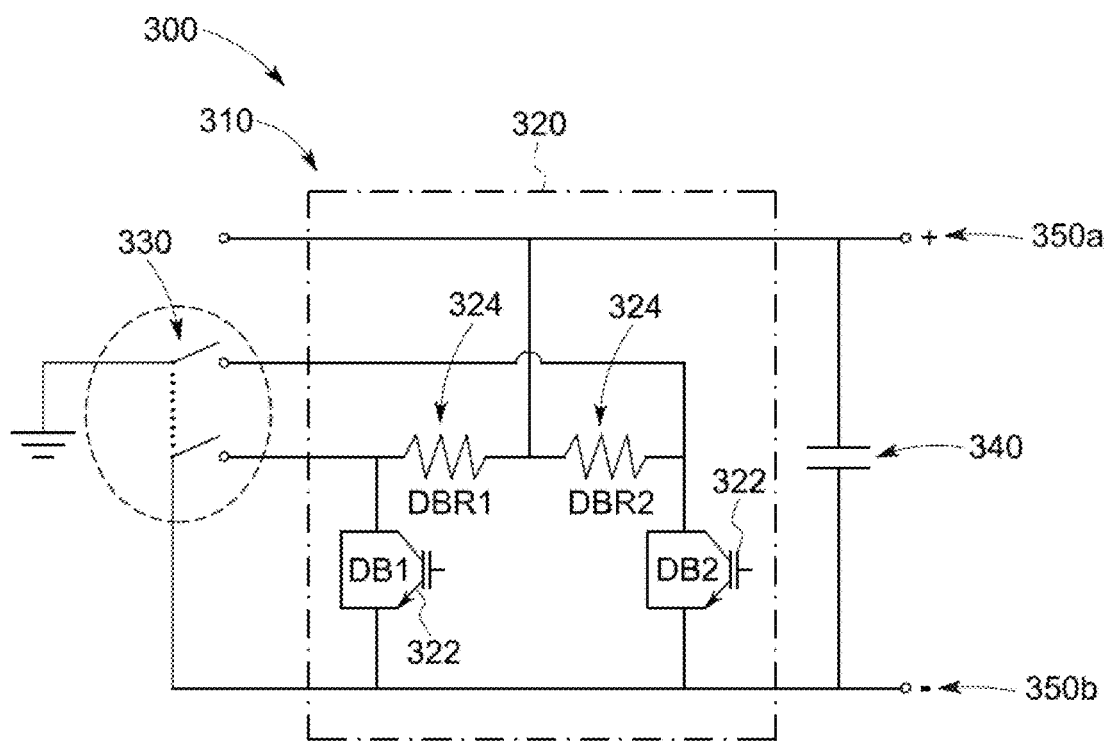
FIG. 3 is a circuit schematic illustrating an earthing switch circuit that can be implemented within one or more alternative embodiments of the present invention.

As shown in FIG. 3, a DC link 300 is provided. The DC link 300 comprises an earthing switch circuit 310 including a DB circuit 320 in communication with an earthing switch 330 (e.g., a two-pole, one-throw switch). The DC link 300 further includes a large capacitance bank 340 and DC rails including a positive terminal 350a and a negative terminal 350b. Similar to FIGS. 1 and 2, the DB circuit 320 comprises a plurality of DB switches 322 in communication with a plurality of DB resistors 324.

In the embodiment of FIG. 3, the DB switches 322 are disposed in parallel and connected at one end thereof to an end of the capacitance bank 340 and the negative terminal 350b. The other end of each DB switch 322 is connected between a respective DB resistor 324 and a respective pole of the earthing switch 330. The opposite ends of the DB resistors 324 are connected to the positive terminal 350a and the large capacitance bank 340. Further, the DB resistors 324 perform dual functionality of controlling in-rush current of the earthing switch circuit 310 while simultaneously controlling the current flow through the circuit by performing a dynamic braking operation when necessary.

The earthing switch circuit 310 of FIG. 3, can be implemented within a center tap resistor system, for example, where approximately one-half of the power is from the positive terminal 350a and the other half of the power is from the negative terminal 350b. The in-rush of current is controlled by carrying the positive voltage through the DB resistors 324 to the negative terminal 350b, and positive voltage through the DB resistors 324 to ground and carrying the ground through DB resistors 324 to the negative terminal 350b.

Figure 4:
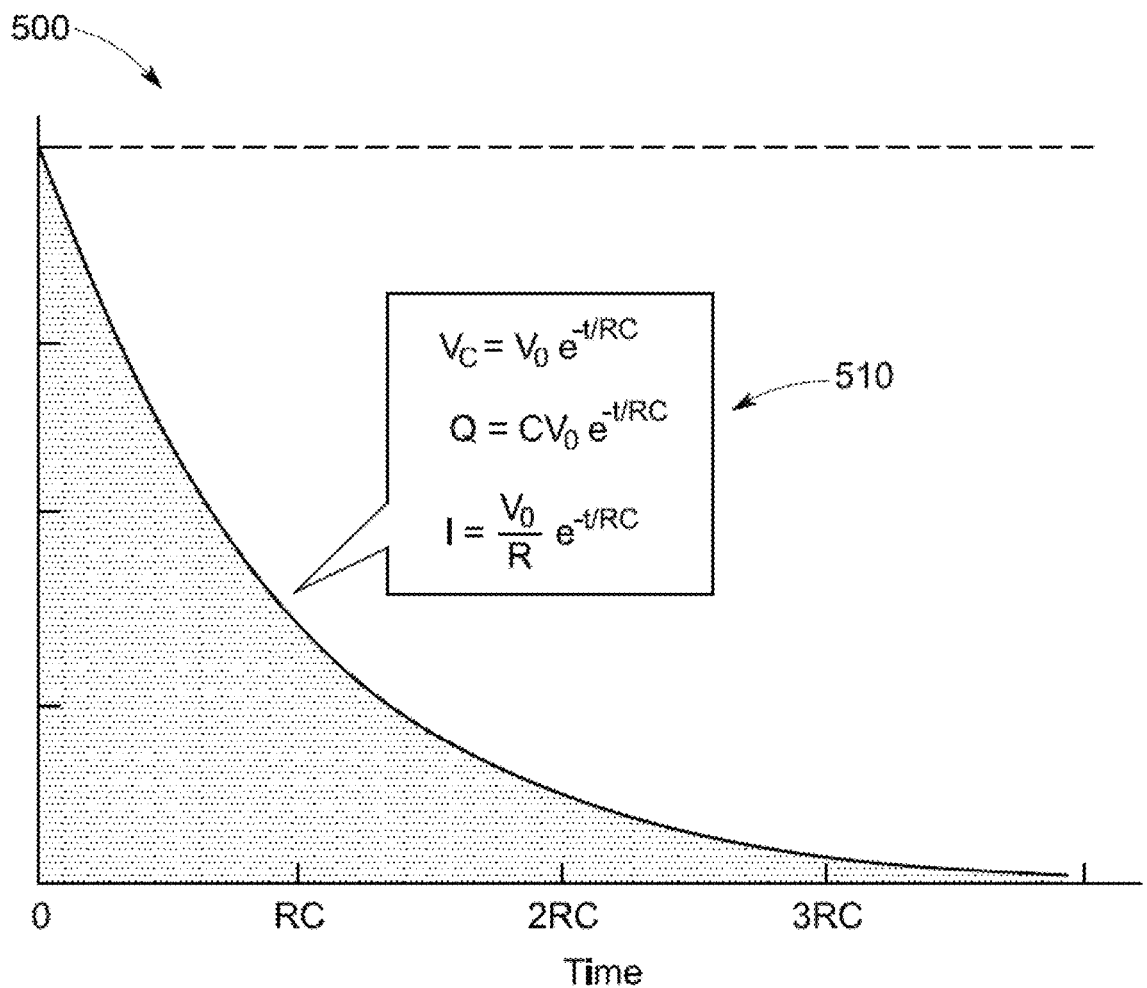
FIG. 4 is a graph illustrating a relationship between the parameters of the earthing switch circuits shown in FIGS. 1, 2 and 3, that can be implemented within one or more embodiments of the present invention.

FIG. 4 is an exemplary graph illustrating a relationship between the parameters of the earthing switch circuit 100, 210 and 310 shown in FIGS. 1, 2 and 3, that can be implemented within one or more embodiments of the present invention.

As shown in FIG. 4, the graph 500 includes equations for the parameters including voltage $V_C$, current I, capacitance C, energy (i.e., charge) Q and resistance R where: $V_C=V_O$ and $Q=C\ V_O$ and $I=V_O/R$ As shown, the parameters voltage $V_C$, current C and charge Q follow the same decay curve 510 when the earthing switches 110, 230 and 330 shown in FIGS. 1, 2 and 3 are closed.

Embodiment of the present invention, provide the advantages of dual functionality of the resistors to both dissipate energy in the power bridge circuit and simultaneously reducing the inrush of current on the earthing switch circuit, effectively, thereby reducing the need for additional components, such as the use of grounding cables. Thus, the present invention reduces costs associated with the maintenance process of power equipment.

This written description uses examples to disclose the invention including the best mode, and also to enable any person skilled in the art to practice the invention, including making and using any devices or apparatuses and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An earthing switch circuit connected to a direct current (DC) link comprised of a positive terminal and a negative terminal having capacitance or energy storage capability, the earthing switch circuit comprising:
   a dynamic braking circuit including a plurality of dynamic braking (DB) switches connected in parallel, and a plurality of dynamic braking (DB) resistors connected together in series and disposed between the plurality of DB switches; and
   an earthing switch connected between the DB circuit and ground, wherein the plurality of DB resistors are connected to the earthing switch and configured to: (i) dissipate energy thermally when performing a dynamic braking operation and simultaneously (ii) decrease in-rush current for the earthing switch circuit upon closure of the earthing switch
   wherein the plurality of DB switches are connected at one end thereof to an end of the capacitance and the positive terminal or the negative terminal, and the other end of each DB switch of the plurality of DB switches is connected between the plurality of DB resistors and a respective pole of the earthing switch, and opposite ends of the plurality of DB resistors are connected to the positive terminal or the negative terminal and the capacitance.

2. The earthing switch circuit of claim 1, wherein the earthing switch is connected between one of the positive terminal or the negative terminal and the plurality of DB resistors, and wherein an opposite side of the plurality of DB resistors is connected to the opposing terminal of the positive terminal or the negative terminal.

3. The earthing switch circuit of claim 2, wherein when the earthing switch is closed, potential on the positive terminal, the negative terminal and ground become connected at a single electrical node, thereby transiently reducing voltage until the potential is zero and the positive and negative terminals are short-circuited together.

4. The earthing switch circuit of claim 1, wherein the plurality of DB switches are each connected at one end to the positive terminal or the negative terminal, and at the other end thereof to an end of each respective DB resistor, and opposite ends of the plurality of DB resistors are connected with the positive terminal or the negative terminal therebetween, the DB switches are also connected to poles of the earthing switch.

5. The earthing switch circuit of claim 4, wherein when voltage on the DC link increases to a predetermined level, the plurality of DB switches together are configured to: duty cycle energy into the DB circuit to decrease voltage between the positive terminal and the negative terminal.

6. The earthing switch circuit of claim 1, wherein the decrease in the in-rush of current is controlled by carrying positive voltage through the plurality of DB resistors to the negative terminal, and positive voltage through the plurality of DB resistors to ground, and by carrying the ground through the plurality of DB resistors to the negative terminal.

7. A method comprising:
   providing an earthing switch circuit in a direct current (DC) link connected between a capacitance and DC rails comprising a positive terminal and a negative terminal, connecting a dynamic braking (DB) circuit including a plurality of dynamic braking (DB) switches connected in parallel and a plurality of dynamic braking (DB) resistors connected together in series and disposed between the plurality of DB switches; and
   connecting an earthing switch between the DB circuit and ground wherein the plurality of DB resistors are connected to the earthing switch;
   connecting one end of the plurality of DB switches to an end of the capacitance and the positive terminal or the negative terminal, and the other end of each DB switch of the plurality of DB switches between the plurality of DB resistors and a respective pole of the earthing switch, and connecting opposite ends of the plurality of DB resistors to the positive terminal or the negative terminal and the capacitance; and
   dissipating via the plurality of DB resistors, energy thermally when performing a dynamic braking operation and simultaneously decreasing, via the at least one DB resistor, in-rush current for the earthing switch circuit upon closure of the earthing switch.

8. The method of claim 7, further comprises: connecting the earthing switch between one of the positive terminal or the negative terminal and the plurality of DB resistors, and wherein an opposite side of the plurality of DB resistors is connected to the opposing terminal of the positive terminal or the negative terminal.

9. The method of claim 8, wherein when the earthing switch is closed, connecting potential on the positive terminal, the negative terminal and ground at a single electrical node, thereby transiently reducing voltage until the potential is zero and the positive and negative terminals are short-circuited together.

10. The method of claim 7, further comprising: connecting the plurality of DB switches at one end to the negative terminal, and at the other end thereof to an end of each respective DB resistor, and opposite ends of the plurality of DB resistors are connected with the positive terminal therebetween; and connecting the plurality of DB switches to poles of the earthing switch.

11. The method of claim 10, wherein when voltage on the DC link increases to a predetermined level, duty cycling, via the plurality of DB switches together, energy into the DB circuit to decrease voltage between the positive terminal and the negative terminal.

12. The method of claim 7, wherein the decreasing of the in-rush of current is controlled by carrying positive voltage through the plurality of DB resistors to the negative terminal, and positive voltage through the plurality of DB resistors to ground, and by carrying the ground through the plurality of DB resistors to the negative terminal.

* * * * *